US009996446B2

(12) United States Patent
Lefor et al.

(10) Patent No.: US 9,996,446 B2
(45) Date of Patent: Jun. 12, 2018

(54) USER EXPERIENCE DIAGNOSTICS WITH ACTIONABLE INSIGHTS

(71) Applicant: Microsoft Technology Licensing, LLC, Redmond, WA (US)

(72) Inventors: Todd Lefor, Fargo, ND (US); Patricia Ryan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 14/263,590

(22) Filed: Apr. 28, 2014

(65) Prior Publication Data

US 2015/0309911 A1 Oct. 29, 2015

(51) Int. Cl.
*G06F 3/048* (2013.01)
*G06F 11/34* (2006.01)
*G06F 11/30* (2006.01)

(52) U.S. Cl.
CPC ...... *G06F 11/3495* (2013.01); *G06F 11/3065* (2013.01); *G06F 11/3419* (2013.01); *G06F 11/3409* (2013.01); *G06F 11/3433* (2013.01); *G06F 2201/81* (2013.01); *G06F 2201/865* (2013.01); *G06F 2201/875* (2013.01)

(58) Field of Classification Search
None
See application file for complete search history.

(56) References Cited

U.S. PATENT DOCUMENTS

| 6,044,335 | A | 3/2000 | Ksendzov | |
|---|---|---|---|---|
| 6,499,029 | B1* | 12/2002 | Kurapati | G06F 17/30817 707/750 |
| 6,975,963 | B2 | 12/2005 | Hamilton et al. | |
| 7,231,606 | B2 | 6/2007 | Miller et al. | |
| 7,912,573 | B2 | 3/2011 | Lee et al. | |
| 8,209,218 | B1 | 6/2012 | Basu et al. | |
| 8,327,335 | B2 | 12/2012 | Noble et al. | |
| 8,407,340 | B2 | 3/2013 | Zamora Cura | |
| 8,589,790 | B2 | 11/2013 | Seolas et al. | |
| 2003/0079160 | A1* | 4/2003 | McGee | G06F 11/0709 714/39 |
| 2006/0101308 | A1* | 5/2006 | Agarwal | G06F 11/0709 714/25 |
| 2006/0112090 | A1* | 5/2006 | Amer-Yahia | G06F 17/3053 |
| 2008/0162209 | A1 | 7/2008 | Gu et al. | |
| 2008/0235365 | A1 | 9/2008 | Bansal et al. | |

(Continued)

FOREIGN PATENT DOCUMENTS

WO WO 2013/055711 A2 4/2013

OTHER PUBLICATIONS

"International Preliminary Report on Patentability Issued in PCT Application No. PCT/US2015/026969", dated Jul. 15, 2016, 8 Pages.

(Continued)

*Primary Examiner* — William C Trapanese
(74) *Attorney, Agent, or Firm* — Christopher R. Christenson; Kelly, Holt & Christenson, PLLC

(57) ABSTRACT

The performance of computer system responses to user requests is measured and evaluated in the context of physical computing resource operation. Diagnostic information related to computer system performance is selectively provided based the measured performance and physical computing resource operation.

17 Claims, 11 Drawing Sheets

(56) References Cited

U.S. PATENT DOCUMENTS

| | | |
|---|---|---|
| 2008/0270469 A1 | 10/2008 | Myerson et al. |
| 2010/0079488 A1 | 4/2010 | McGreevy et al. |
| 2011/0098973 A1 | 4/2011 | Seidman |
| 2012/0144246 A1 | 6/2012 | Dreyfoos et al. |
| 2013/0097198 A1 | 4/2013 | Goteti et al. |
| 2013/0262656 A1 | 10/2013 | Cao et al. |
| 2014/0082689 A1 | 3/2014 | Christiaens et al. |
| 2015/0039942 A1* | 2/2015 | Che .................. G06F 11/3612 714/38.1 |
| 2015/0294256 A1 | 10/2015 | Mahesh et al. |

OTHER PUBLICATIONS

International Search Report and Written Opinion for International Application No. PCT/US2015/026969, dated Aug. 5, 2015, date of filing: Apr. 22, 2015, 11 pages.

"Using PageSpeed for Firefox", Published on: Aug. 1, 2013, Available at: https://developers.google.com/speed/docs/insights/using_firefox.

Butkiewicz, et al., "Understanding Website Complexity: Measurements, Metrics, and Implications", In Proceedings of the 11th ACM SIGCOMM Conference on Internet Measurement, Nov. 2, 2011, 14 pages.

"Jiffy-web", Published on: Jun. 23, 2008, Available at: https://code.google.com/p/jiffy-web/.

"WebPagetest Documentation", Published on: Mar. 8, 2013, Available at: https://sites.google.com/a/webpagetest.org/docs/using-webpagetest/quick-start-quide.

"Second Written Opinion Issued in PCT Application No. PCT/US2015/026969", dated Apr. 8, 2016, 7 Pages.

Cormode, et al., "Probabilistic Histograms for Probabilistic Data", In Proceedings of PhD Workshop. Co-located with the 35th International Conference on Very Large Data Bases, Aug. 24, 2009, 12 pages.

Shapira, et al., "Multiple Histogram Matching", Published on: Oct. 19, 2013, Available at: http://www.eng.tau.ac.il/~avidan/papers/hist_icip_13.pdf.

International Search Report and Written Opinion for International Patent Application No. PCT/US2015/024413, dated Jul. 6, 2015, date of filing: Apr. 6, 2015, 9 pages.

Second Written Opinion for International Application No. PCT/US2015/024413, dated Sep. 7, 2015, date of filing: Apr. 6, 2015, 6 pages.

International Preliminary Report on Patentability for International Application No. PCT/US2015/024413, dated Feb. 4, 2016, date of filing: Apr. 6, 2015, 12 pages.

Prosecution History for U.S. Appl. No. 14/458,960 including: Amendment dated Apr. 26, 2017, and Non-Final Office Action dated Jan. 26, 2017, 34 pages.

* cited by examiner

USER EXPERIENCE DIAGNOSTICS WITH ACTIONABLE INSIGHTS

BACKGROUND

When a user interacts with a computer system, it is important for the system to respond quickly to the user. If the system does not respond to the user in a timely manner, the user may become frustrated. The user may not know the extent of the operations that are required in order to fulfill the user's request of the system. Moreover, the user may not know all of the subsystem operations that are executed to fulfill a simple user request or operation. This is particularly so when the computer system is relatively large employing two or more servers cooperating to fulfill the user request. Thus, measuring or otherwise quantifying the system response to the user of a computer system, while possibly valuable, is quite difficult.

When evaluating real world performance of operations of such computer systems, there may be variations in performance of various subsystems that can obfuscate the true causes of performance issues. For example, when evaluating the performance of loading any one of a collection of a system of forms, there are enough variants in form performance that make it difficult to understand whether the form is performing poorly or not. For example, if the form was opened at a sub-optimal time when there was an undue or exceptional physical load or influence on the computer system, even an otherwise well-performing form may perform poorly.

The discussion above is merely provided for general background information and is not intended to be used as an aid in determining the scope of the claimed subject matter.

SUMMARY

The performance of computer system responses to user requests is measured and evaluated in the context of physical computing resource operation. Diagnostic information related to computer system performance is selectively provided based on the measured performance and physical computing resource operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Described below are processes and structures for performing diagnostic analysis on a computer system that executes operations in response to user requests. The requested operation can be any function, subroutine, method or process that is performed by the computer system. As defined herein, an operation is any function, method, subroutine or process performed on a computer system using a plurality of subsystems. When a user interacts with the computer system, resources associated with the computer system are employed. For example, a user may request that the computer system perform a specific operation, such as creating an invoice. The request may be received through an interface, such as a network interface, and passed to a microprocessor of the computer system to operate on information provided by the user. The microprocessor may then employ memory or a hardware interface to obtain information necessary to fulfil the user request. The computer system's response may then be conveyed to the user through the interface. Often, the user is only aware of his/her request and the time that it takes to receive the computer system's response. Typically, the user is not aware of the operation of the various subsystems that are required to fulfill a specific request. Additionally, if operation of any particular subsystem is too slow, the overall computer system response will be affected. Further, there are a number of factors that can affect subsystem operation. For example, the requested operation may be very complex or require a large sequence of subsystem operations. Alternately, the physical computing resources required for the various subsystem operations may be overly burdened.

Figure 1:
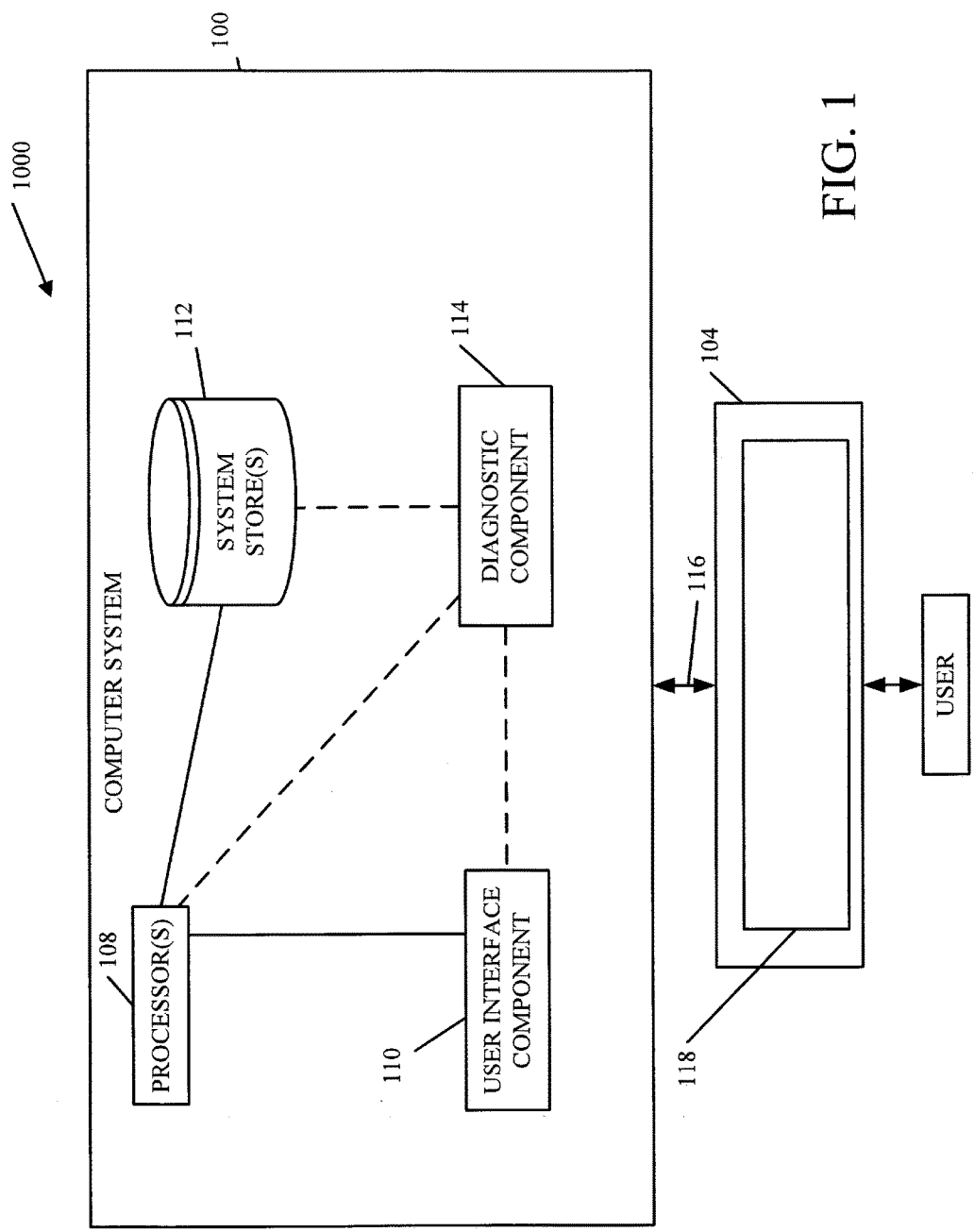
FIG. 1 is a block diagram of one computing environment in which embodiments described herein are useful.

FIG. 1 is a block diagram of one example of a computing environment in which embodiments described herein are useful. Computing environment 1000 includes a user employing user device 104 to interact with computer system 100. User device 104 may be any suitable computing device including a mobile computing device (such as a mobile phone, tablet, netbook or laptop computer), desktop computing system, embedded computing system, et cetera. Computer system 100 may be any suitable arrangement of one or more computers, servers, or cores arranged to provide any suitable function to one or more users. In one embodiment, computer system 100 will be described in the context of a business computing system. However, embodiments described herein are not limited to such a business computing system.

Computer system 100 includes one or more processors 108 that are coupled to user interface component 110 to serve or otherwise provide user interface objects or information to one or more user devices 104. Computer system 100 also includes one or more data stores 112 to store information. Data store(s) 112 can include one or more tables or other data structures arranged in any suitable format.

Computer system 100 also includes or is coupled to diagnostic component 114. Diagnostic component 114 provides actionable insights relative to user experiences with computer system 100. As used herein, an "actionable" insight is an insight that is selectively stored or conveyed based on whether remedial action may be effective to improve performance. Additionally, an "insight" is diagnostic information that is prioritized in comparison to other diagnostic information based on a particular characteristic, such as importance. Diagnostic component 114 is provided with an indication of various software operations that computer system 100 will provide for users thereof as well as a resource mapping indicating how each such software operation is broken into two or more subsystem operations. For each such subsystem operation, the physical computing resources engaged by the subsystem operation are determined and an association of such is stored. Then, when a user requests a specific operation from computer system 100 through UI component 110, diagnostic component 114 determines the amount of time elapsing between the user request and the response of computer system 100. Diagnostic component 114 has or is coupled to data indicating a breakdown of the various subsystem operations and associated physical computing resources for each subsystem operation. Accordingly, diagnostic component 114 is able to determine one or more performance parameters for each physical computing resource while such physical computing resources are engaged in fulfilling the user request. As used herein, a performance parameter is any characteristic or state that can influence the performance of the physical computing resource. Performance parameters include, without limitation, load, status, responsiveness, operating temperature, available bandwidth or capacity, error rate, power consumption, frequency, and duty-cycle.

In one embodiment, performance telemetry of computer system 100 is generated. As used herein, telemetry refers to the gathering of data, such as diagnostic data, and communicating the data to a system, such as diagnostic component 114.

User device 104 is communicatively coupled to computer system 100 as indicated at bidirectional arrow 116. This coupling can take any suitable form including a hardwired connection or a wireless connection passing through any suitable local area network (LAN) or wide area network (WAN). User device 104 provides a user interface 118 with which a user interacts. User interface 118 includes a variety of user interface elements including forms, controls, buttons, et cetera. Through user interface 118, the user initiates a number of operations within computer system 100. As the user interacts with system 100, the various interactions pass through UI component 110 of computer system 100. By virtue of its coupling to UI component 110, diagnostic component 114 is able to identify various software operations requested by the user as well as the associated responses of computer system 100.

For example, where the user requests the opening of a form, diagnostic component 114 will measure how long it takes computer system 100 to open the form. As used herein, a form is a user interface element that presents information to a user in a particular format and receives information from the user. In one embodiment, a form is a collection of prefabricated software components that are assembled together with code in a framework environment. Moreover, since diagnostic component 114 contains or is coupled to a priori information relating each anticipated request for a software operation to various subsystem operations as well as physical computing resources associated with each subsystem operation, diagnostic component 114 can discount or ignore responses of computer system 100 where one or more physical computing resources were unduly burdened or saturated during the respective subsystem operation. In this way, diagnostic component 114 can provide an indication of the responsiveness of computer system 100 regardless of a number of influences on computer system 100 that are outside the control of the software.

Figure 2:
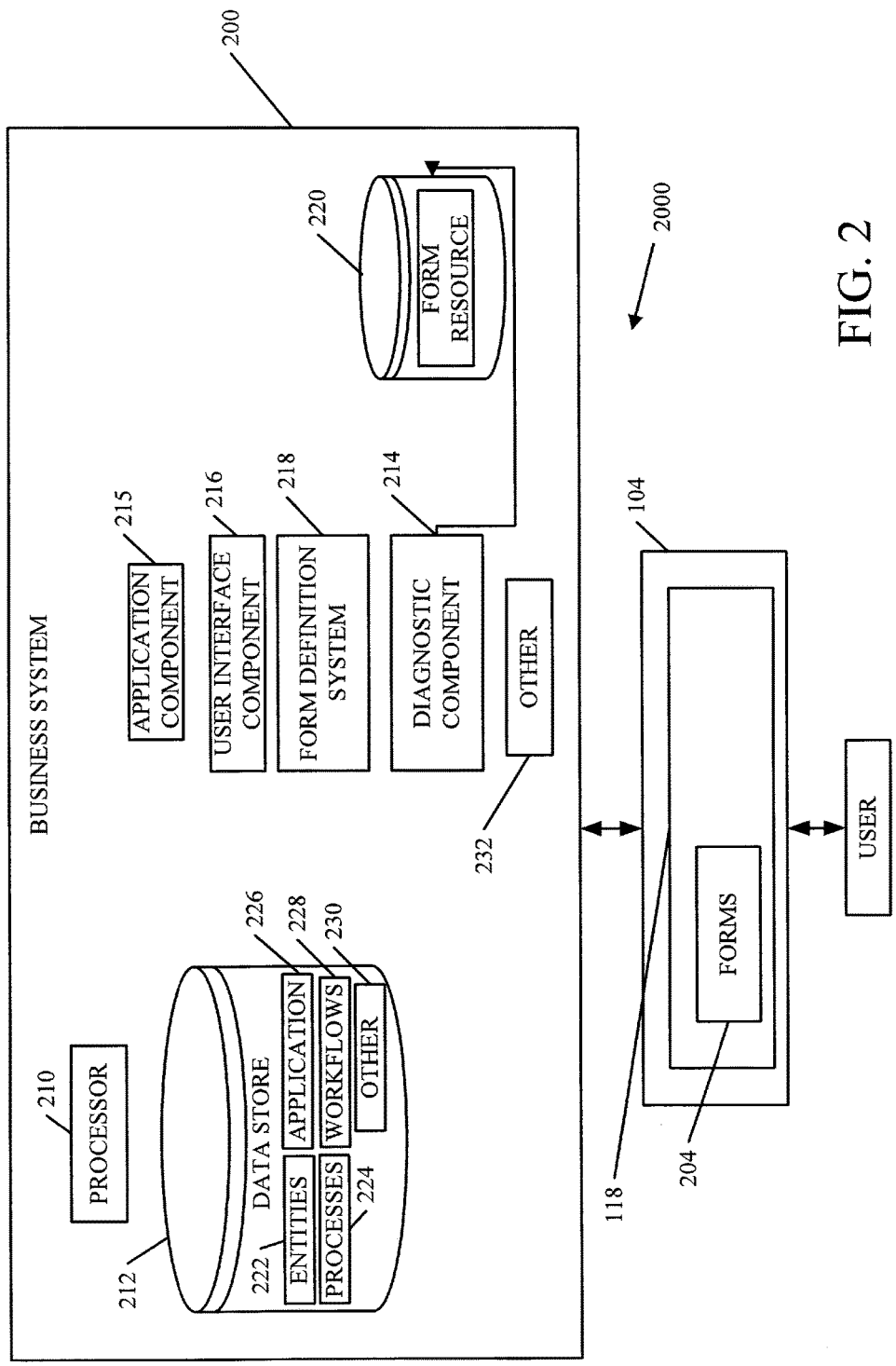
FIG. 2 is a block diagram of a more specific computing environment in which embodiments described herein are useful.

FIG. 2 is a block diagram of one example of a business system environment 2000 in which embodiments described herein are particularly useful. Business system 200 may be an enterprise resource planning (ERP) system, a customer relations management (CRM) system, a line-of-business (LOB) system, among others. Business system 200 is shown generating user interface displays 118 that can include forms 204. Business system 200 may have thousands of different forms 204, each of which may have many controls. The user interacts with the user interface displays 118 in order to interact with, and manipulate, business system 200.

Business system 200, in one example, includes processor(s) 210, data store 212, application component 215, user interface component 216 and form definition system 218. Business system 200 can also include other components 232 as well. Business system 200 includes or is coupled to diagnostic component 214 that includes or is coupled to form resource component 220. Form resource component 220 stores diagnostic information about the various forms of the system as well as information about the physical computing resources required by various subsystems that operate on the forms.

Data store 212, in one embodiment, includes entities 222, processes 224, applications 226, workflows 228 and other data records 230. Entities component 222, in one embodiment, describes entities within business system 200. For instance, a customer entity describes and defines a customer. A vendor entity describes and defines a vendor. An inventory item entity describes and defines an item of inventory. A purchase order entity describes and defines a purchase order. The listing set forth above is provided as a non-limiting example of various entities that can be defined within business system 200.

Applications 226 can be business applications, such as general ledger applications, other accounting applications, inventory tracking applications, applications that track opportunities, as well as a host of other business applications. Application component 215, in one example, runs applications 226, which can include business processes 224 and workflows 228. Processes 224 and workflows 228, in one example, operate on business data entities 222 and other business records 230 to enable the user to perform his or her operations within business system 200. In one example, user interface component 216, either by itself, or under the control of other items in business system 200, generates user interface displays 118.

Figure 3:
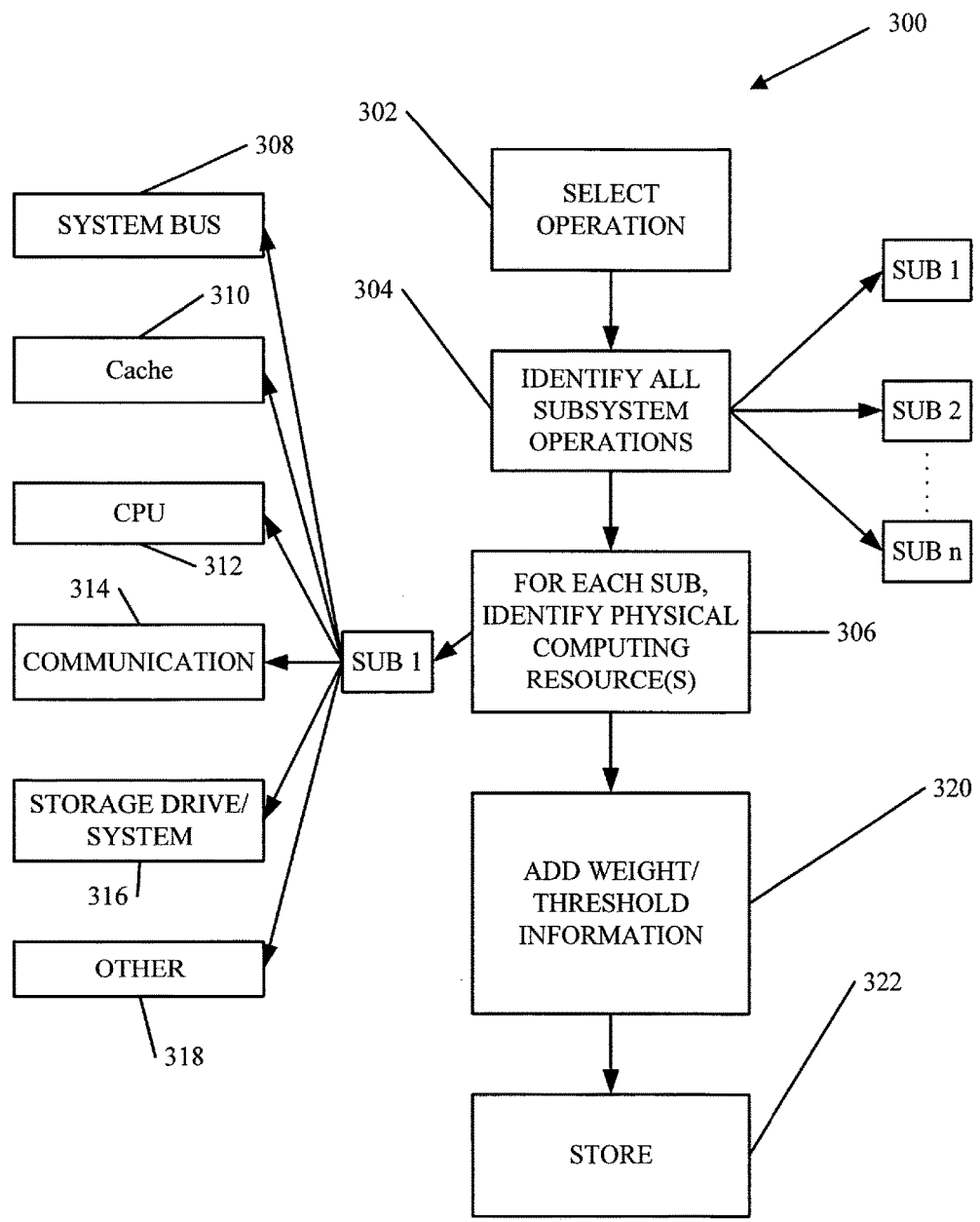
FIG. 3 is a flow diagram of a method of evaluating subsystem operations and associated physical computing resources for a given user requestable operation.

FIG. 3 is a flow diagram of a method of evaluating subsystem operations and associated physical computing resources for a given software operation. Method 300 begins at block 302 where a particular operation is selected. The operation selected at block 302 can be any operation that the computer system is configured to provide to a user. Next, at block 304, subsystem operations that are used or called during the execution of the operation are identified by diagnostic component 114 (shown in FIG. 1). In the example shown, subsystem operations SUB 1, SUB 2—SUB$_n$ are indicated. At block 306, physical computing resources required for each subsystem operation identified in block 304 are identified by diagnostic component 114. In the example, such physical computing resources include System Bus 308, Cache 310, CPU 312. Communication resources 314. Storage drive/system 316, and/or other related hardware 318. In one embodiment, as indicated at block 320, a threshold can be defined for each physical computing resource identified in block 306. Additionally, or alternately, a weight for each physical computing resource can be assigned such that constraints occurring in a particular physical computing resource during execution of the subsystem operation can be given greater or lesser significance than other physical computing resource constraints. Next, at block 322, diagnostic component 114 stores, in resource 220, the subsystem operations identified in block 304, information about the physical computing resources identified at block 306 and thresholds/weights defined at block 320 as associated with the selected operation.

Subsequently, when the operation is requested by the user, the information can be recalled and the performance of the operation can be monitored in the context of the subsystem operations and the status of the associated physical computing resources. Accordingly, if a particular user request takes a very long time, but the physical computing resources are being overly taxed by another software system operation or call, unrelated to the requested function, the poor performance of the computer system in responding to the user request can be deemed not actionable by diagnostic component 114 or 214. If such performance is "not actionable" then technician attention is not required to revise or improve the performance of the operation. Conversely, if the physical computing resources for the various subsystem operations of a user request are not overly burdened, and the performance of the system response to the user request is poor, then such performance can be deemed actionable by diagnostic component 114 or 214. The utilization of physical computing resource constraint thresholds defined in block 320 helps determine when performance issues are actionable and when they are not.

Figure 4:
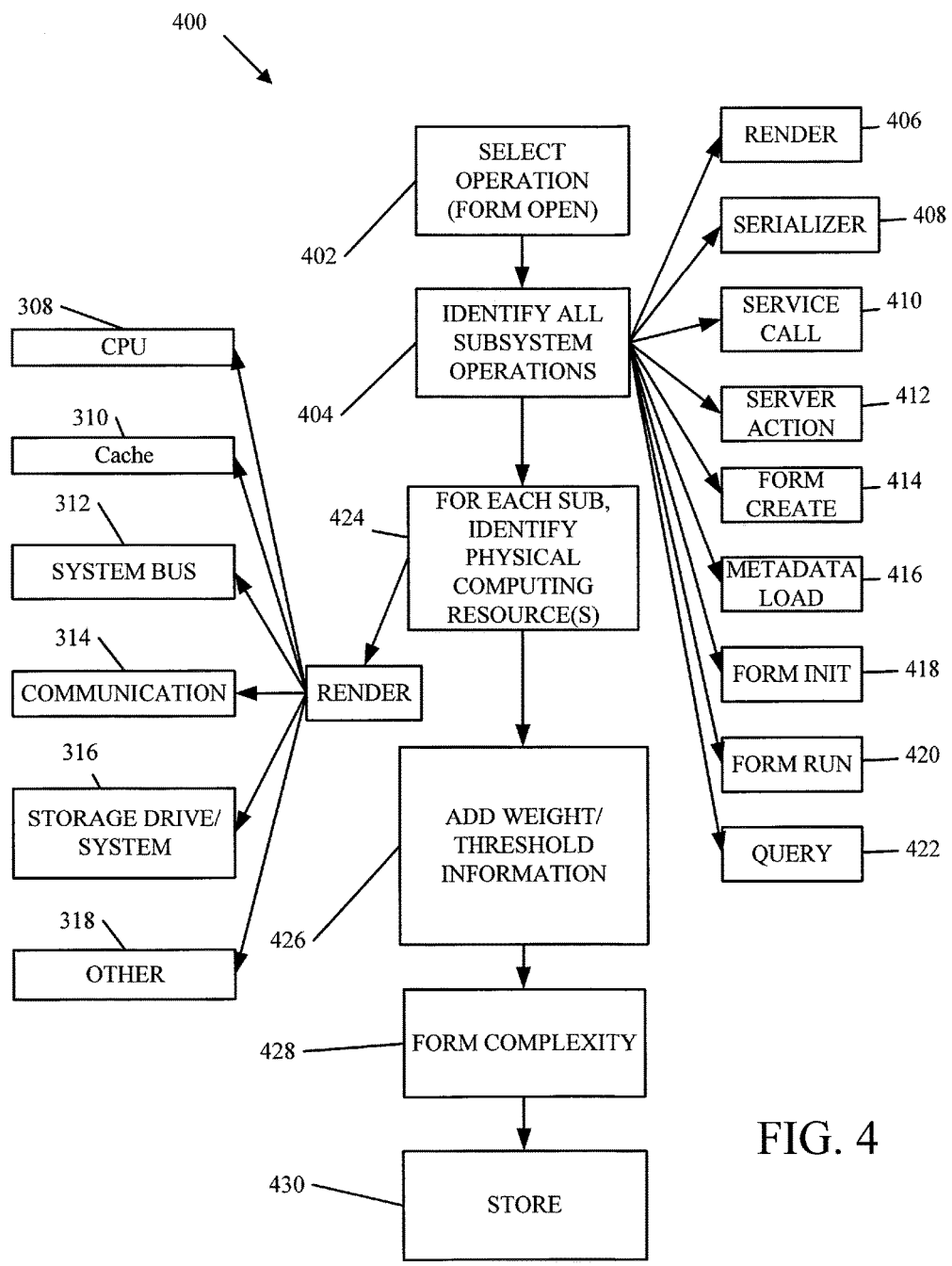
FIG. 4 is a flow diagram of a method of evaluating subsystem operations for a form opening operation.

FIG. 4 is a flow diagram illustrating a method of evaluating subsystem operations for a form-opening operation in a business system. Method 400 begins at block 402, where an opening operation for a particular form is selected or invoked. Next, at block 404, various subsystems or business logic for the form-opening operation are identified. Specifically, when the form is opened, a number of subsystem operations are executed. Those subsystem operations include Render 406, Serializer 408, Service Call 410, Server Action 412, Form Create 414, Metadata Load 416, Form Initialization 418, Form Run 420, and Query 422. These subsystems each perform part of the form-opening operation. Each one of the subsystems takes part in the operation of opening the particular business form. Each subsystem will take time to perform its respective portion of opening the form. For example, one subsystem may retrieve a description of the form while another subsystem will retrieve data for the form, still another subsystem may combine the two and yet another subsystem may build a web page. Each subsystem can return a diagnostic number that is independent of outside influences of the business system that were present during operation of the subsystem. However, if Metadata Load subsystem 416 takes significantly longer than Query subsystem 422, it may indicate a problem if the two are generally expected to take about the same amount of time.

At block 424, physical computing resources for each subsystem operation identified at block 404 are identified by diagnostic component 214 (shown in FIG. 2). In the illustrated example, the physical computing resources for the Render subsystem 406 are identified. Since Render subsystem 406 performs an in-memory process, the influence of cache 310 becomes more pronounced, while the influence of the storage drive/system 316 is non-existent. These influences are characterized by diagnostic component 214 at block 424 and associated with Render subsystem 406 in resource 220. In one embodiment, block 426 is used where weights and/or threshold information can be evaluated relative to each physical computing resource identified relative to the particular subsystem operation.

At block 428, form complexity is evaluated by diagnostic component 214. Form complexity is an indication of the relative complexity of the form in comparison to other forms in the business system. Form complexity can be a function of the performance influencing aspects of the form, such as the number of data sources associated with the form, the number of join relations required to open the form, the number of high, medium and low complexity controls provided within the form, as well as the total number of controls. These examples are provided for illustration and any aspect of the form which can conceivably influence performance of the form can be used to define the form complexity.

At block 430, the subsystem information identified at block 404, the physical computing resources identified at block 424, optional weights/threshold information provided at block 426 and the form complexity provided at block 428 are stored by diagnostic component 214 for reference when the form-open operation is requested.

Figure 5:
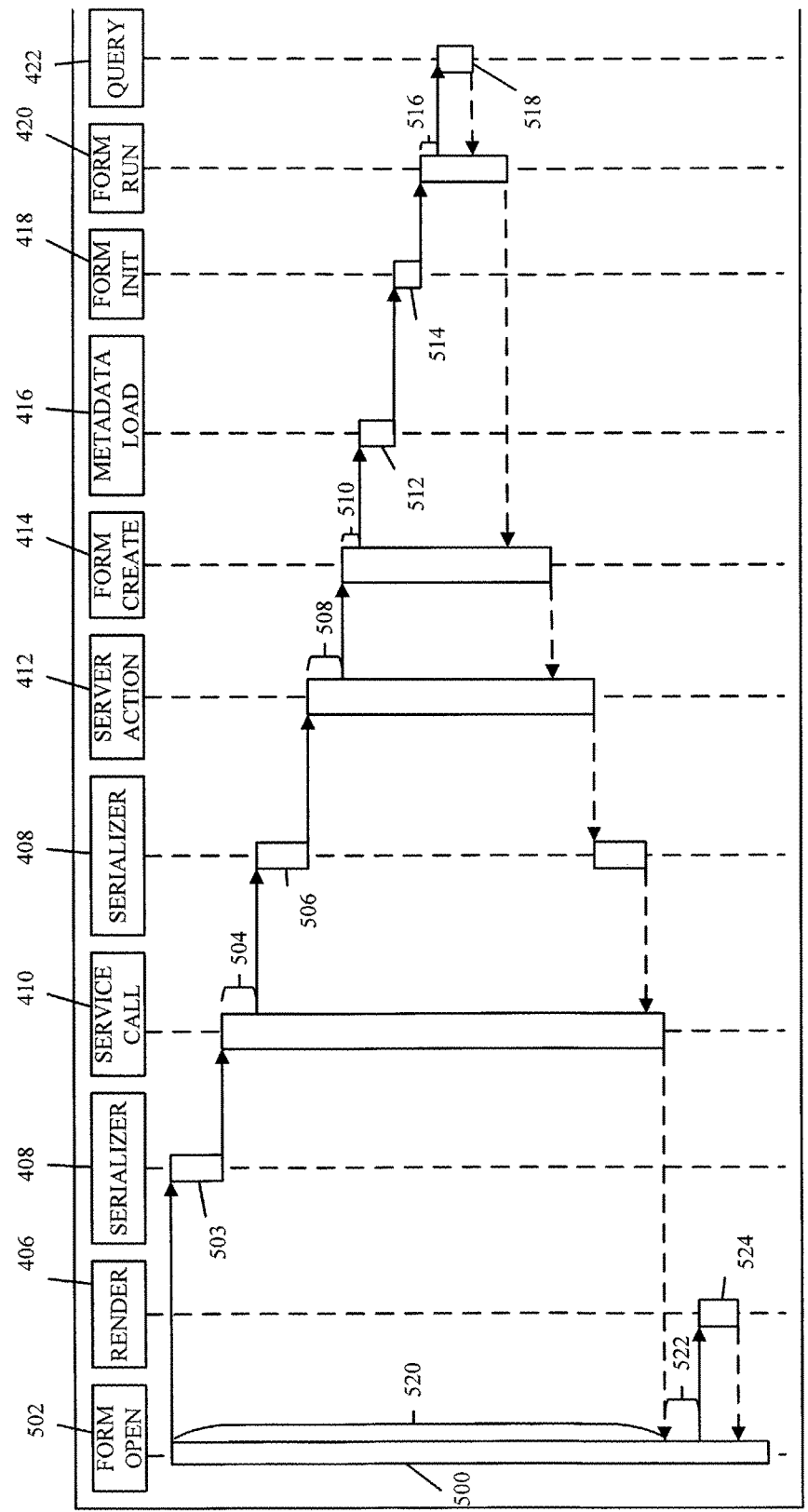
FIG. 5 is a swim lane diagram of a form-opening operation.

FIG. 5 is a swim lane diagram of the form-opening operation described with respect to FIG. 4. The total amount of time required to open the form is illustrated as vertical line 500 under Form Open box 502. Once the form-opening operation is requested, control passes to Serializer subsystem 408, which requires an amount of time indicated by vertical line 503 to package the data required to open the form such that the data can be transferred or otherwise communicated. Once the Serializer subsystem has completed its operation, control passes to Service Call subsystem 410 where a service call is generated. As shown, however, after a small time, indicated at bracket 504, control passes back to Serializer subsystem 408 to perform an additional data packaging operation. Serializer 408 takes some additional time, indicated at vertical line 506, to complete its operation and then control passes to Server Action subsystem 412. Server Action subsystem requires time 508 to complete its operation and then control passes to Form Create subsystem 414. Form create subsystem 414 requires time 510 to complete its operation and then control passes to Metadata Load system 416, which loads metadata for the form in the time indicated at vertical line 512. Once metadata load system 416 completes its operation, control passes to Form Initialization subsystem 418, which requires time 514 to initialize the form. Once the form is initialized, control passes to Form Run subsystem 420, which begins running the form and, after time 516, passes control to Query subsystem 422. Query subsystem 422 executes a query in time 518 and returns control to Form Run subsystem 420. Control returns from Form Run subsystem 420 to Form Open 502 in a similar manner. Note, control returns to Form Open 502 at time 520. After time 522, control passes to Render subsystem 406 which requires time 524 to perform its operation. Upon completion of its operation, Render subsystem 406 returns control to Form Open system 502 and the form-opening operation is complete.

Thus, as illustrated the various subsystems required to open the form take varying amounts of time. Moreover, the time required for each subsystem to perform its operation can be influenced by factors beyond the control or purview of the software. Further still, certain subsystems may be more influenced by different physical computing resource conditions than other subsystems. Thus, embodiments described herein are able to monitor physical computing resource parameters or conditions while various subsystems execute their operations and determine whether performance of such subsystem operations is acceptable based on defined physical computing resource requirements for each such subsystem operation.

Figure 6:
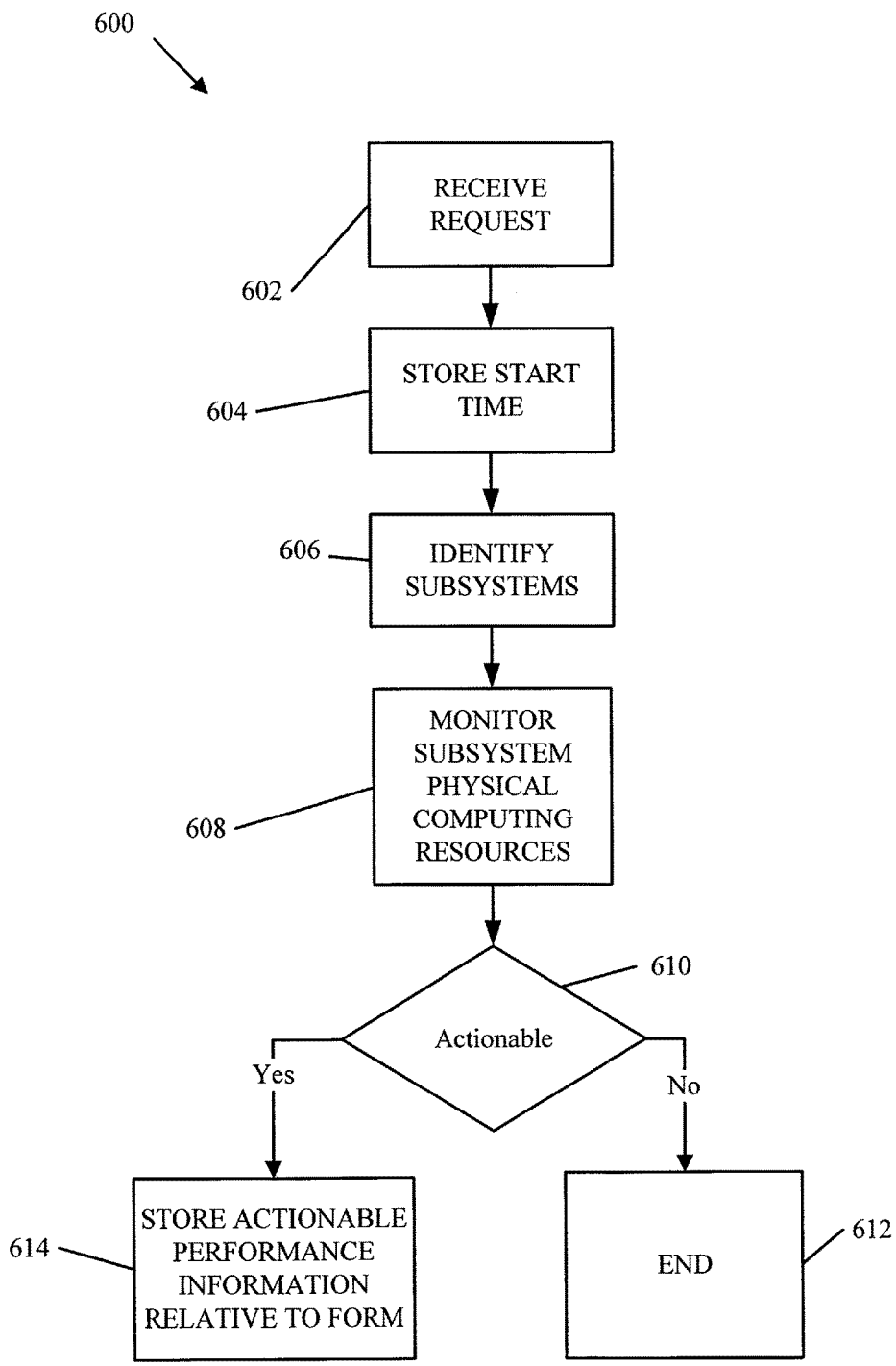
FIG. 6 is a flow diagram of a method of evaluating computer system operation in response to a user request.

FIG. 6 is a flow diagram of a method of evaluating computer system operation in response to a user request. Method 600 begins at block 602 where diagnostic component 114 (shown in FIG. 1) or 214 (shown in FIG. 2) detects reception of an incoming user operation request. At block 604, the start time relative to the user operation request is stored. Next, at block 606, the various subsystem operations and subsystems associated with the requested operation are identified by diagnostic component 114 or 214. Additionally, the physical computing resources required for each such subsystem operation are determined. This determination can take any suitable form including accessing a resource that defines all subsystem operations relative to the requested operation and the associated physical computing resources as described above with respect to FIGS. 3 and 4. At block 608, the times required for each subsystem operation are measured while the physical computing resources mapped or otherwise associated with execution of the subsystem operations are monitored. At block 610 it is determined whether performance of the user requested operation is actionable. This determination may be done by evaluating the total execution time in the context of the various subsystem operation execution times and measured physical computing resource performance parameters that were occurring while the subsystem operations executed, such as system load, temperature, error rate, et cetera. If the performance of the computer system is actionable (poor execution time when the physical computing resources are generally not overly burdened), control passes to block 614. At block 614, the actionable information: user requested operation, subsystem execution performance, and physical computing resource parameters are stored for later analysis. However, if the physical computing resource(s) were overly burdened during execution of one or more subsystem operations, then the operations poor performance is not determined to be actionable and method 600 ends at block 612. In this way, the diagnostic information is selectively stored based on the monitored physical computing resources.

Figure 7:
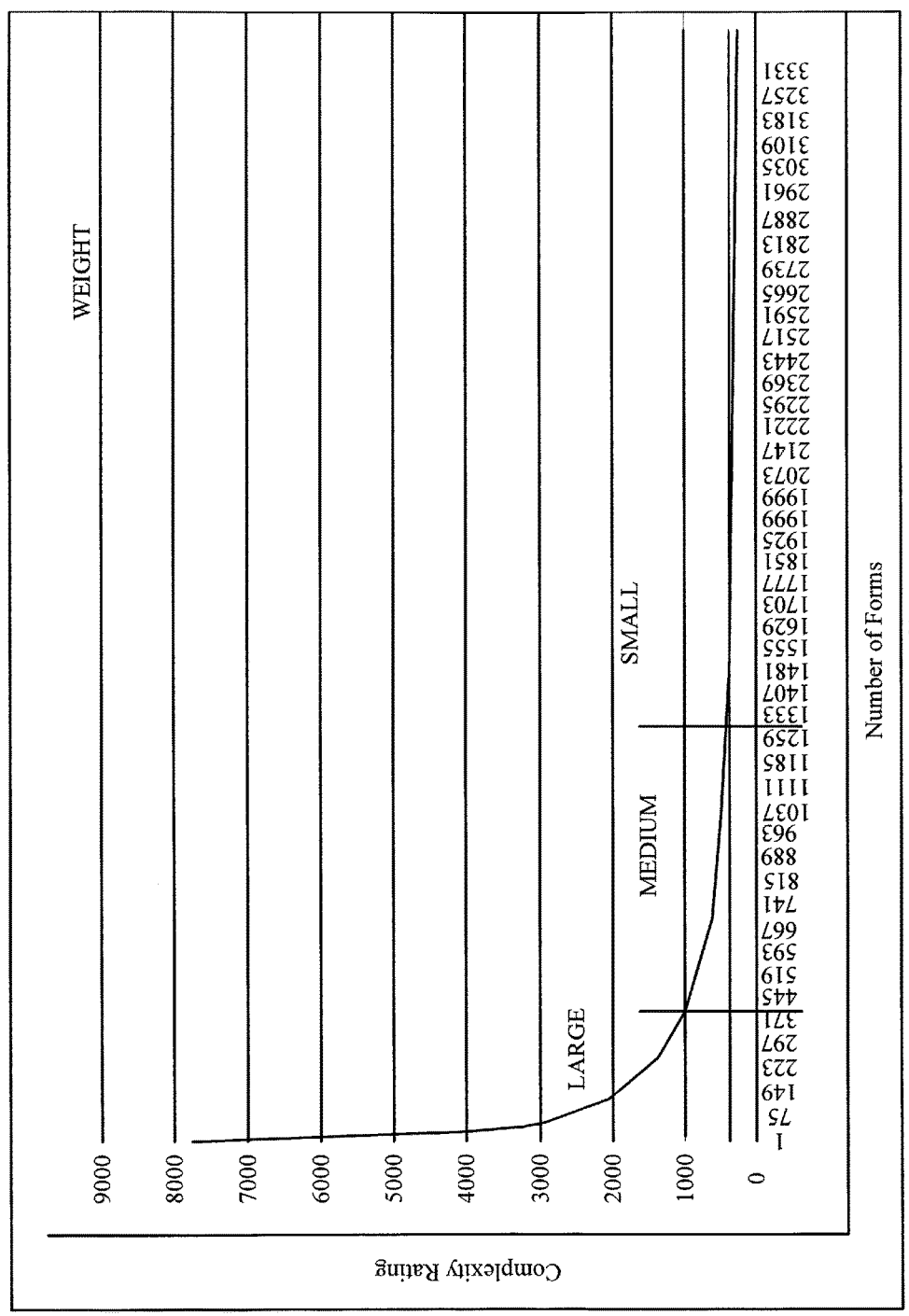
FIG. 7 is a chart illustrating weight assigned based on form complexity (vertical axis) and the number of forms (horizontal axis) in one embodiment.

FIG. 7 is a chart illustrating varying weight assigned to form performance based on frequency of use. The importance of each actionable form performance is not necessarily the same as other actionable forms. For example, if a form is rarely used, its performance can be addressed with lesser urgency than a poorly performing form that is used often. FIG. 7 illustrates a weighting system based on form frequency (horizontal axis) and the amount of time required to open the form (vertical axis).

Figure 8:
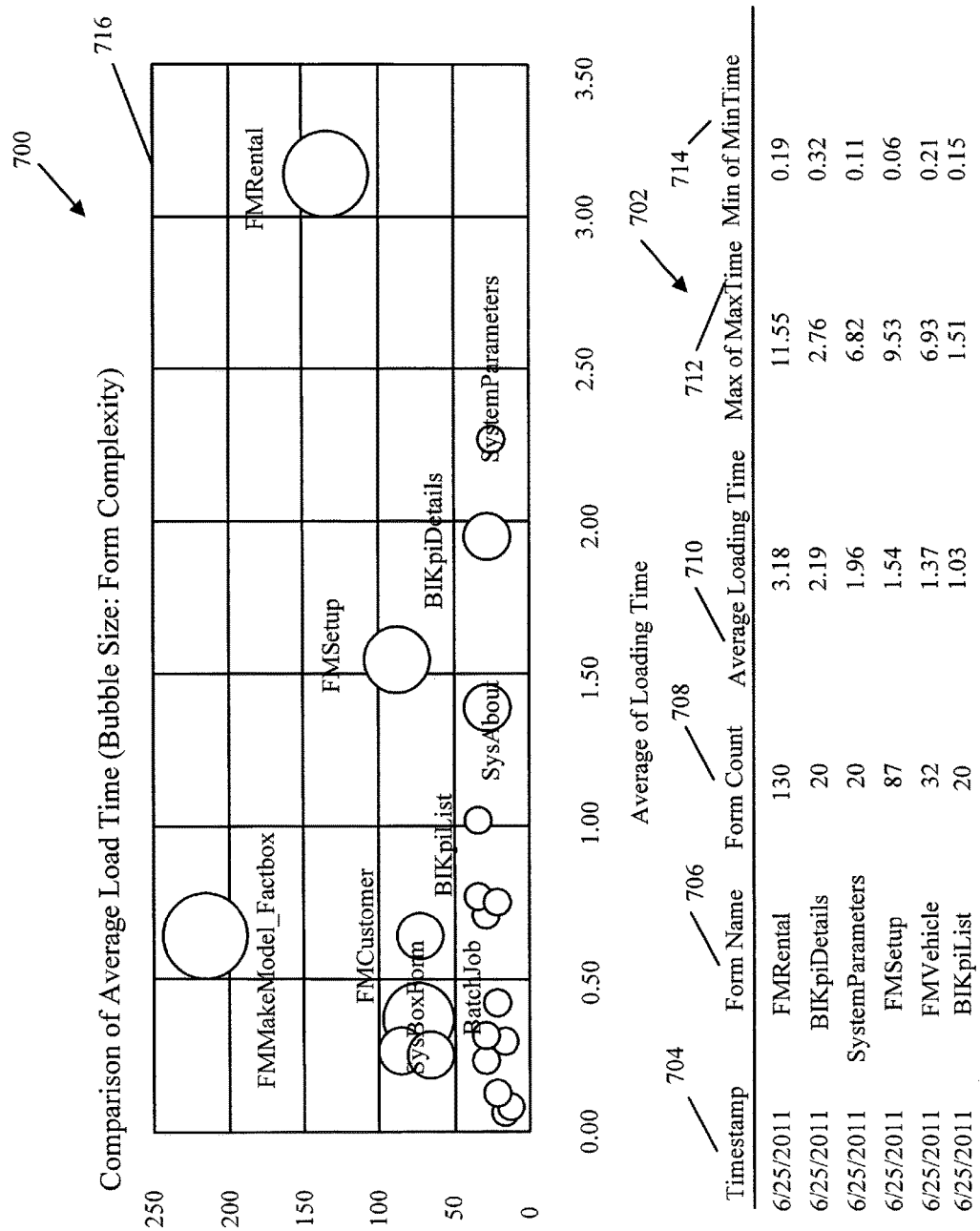
FIG. 8 is a diagrammatic view of a user interface of a form diagnostic tool in a computing system.

FIG. 8 is a diagrammatic view of a screenshot of a form diagnostic tool in a business computing system. Screenshot 700 has tabular portion 702 with columns for time 704, form name 706, form count 708, average load time 710, maximum time required to open the form 712, and minimum amount of time required to open the form 714. The various forms are indicated as rows below the column headings with form "FMRental" being listed first. Notably, FMRental has an average loading time of 3.18 seconds and a count of 130. Thus, the loading performance of FMRental is poor in comparison to the other forms. Further, the importance of the form performance is increased by virtue of the fact that FMRental is opened more than the other forms listed in tabular portion 702. Screenshot 700 also includes Count/Time/Complexity depiction 716 (shown as a bubble diagram in FIG. 8). In bubble diagram 716, the complexity of a given form is depicted as the size of the bubble. The average loading time is indicated as the horizontal axis while the form count, or frequency is shown as the vertical axis. When shown in bubble form, FMRental stands to the right of the other forms based on its average load time and thus requires additional optimizations.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms arranged thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
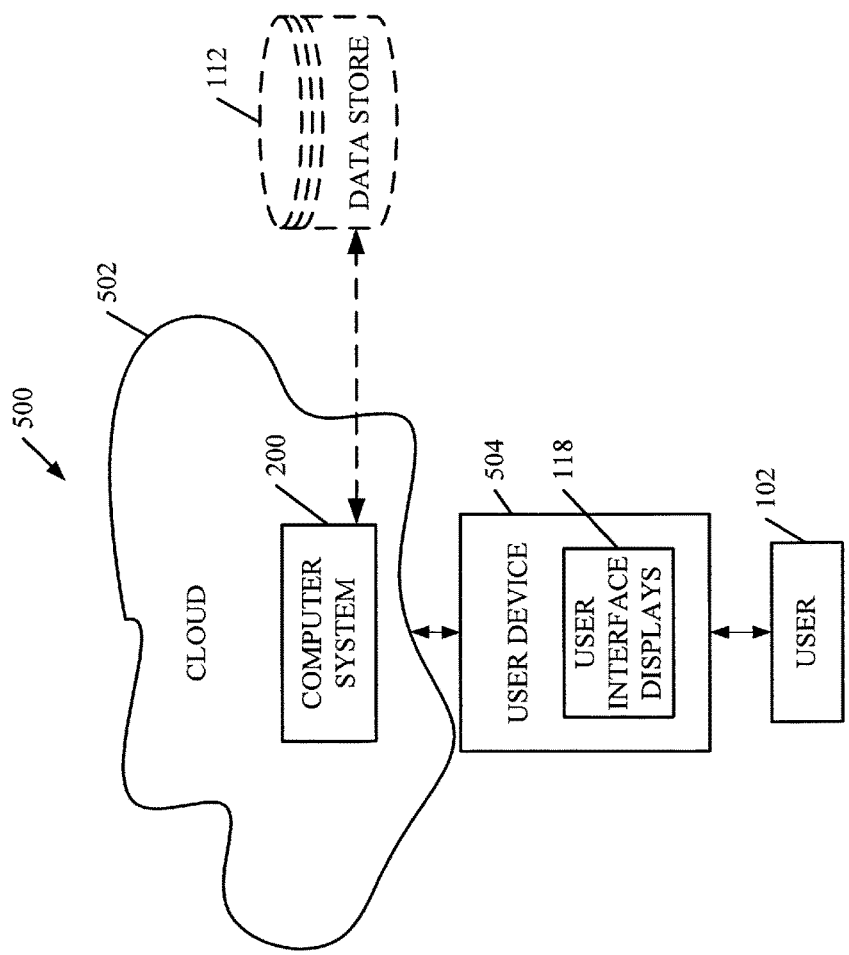
FIG. 9 is a block diagram showing the system of FIG. 2 in a cloud computing architecture.

FIG. 9 is a block diagram of architecture 200, shown in FIG. 2, except that its elements are communicably networked within a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 200 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 9, some items are similar to those shown in FIG. 2 and they are similarly numbered. FIG. 9 specifically shows that business system 200 is located in cloud 502 (which can be public, private, or a combination where portions are public while others are private). Therefore, the user uses a user device 504 to access those systems through cloud 502.

FIG. 9 also depicts another embodiment of a cloud architecture. FIG. 9 shows that it is also contemplated that some elements of business system 200 can be implemented in cloud 502 while others are not. By way of example, data store 112 can be located outside of cloud 502, and accessed through cloud 502.

Figure 10:
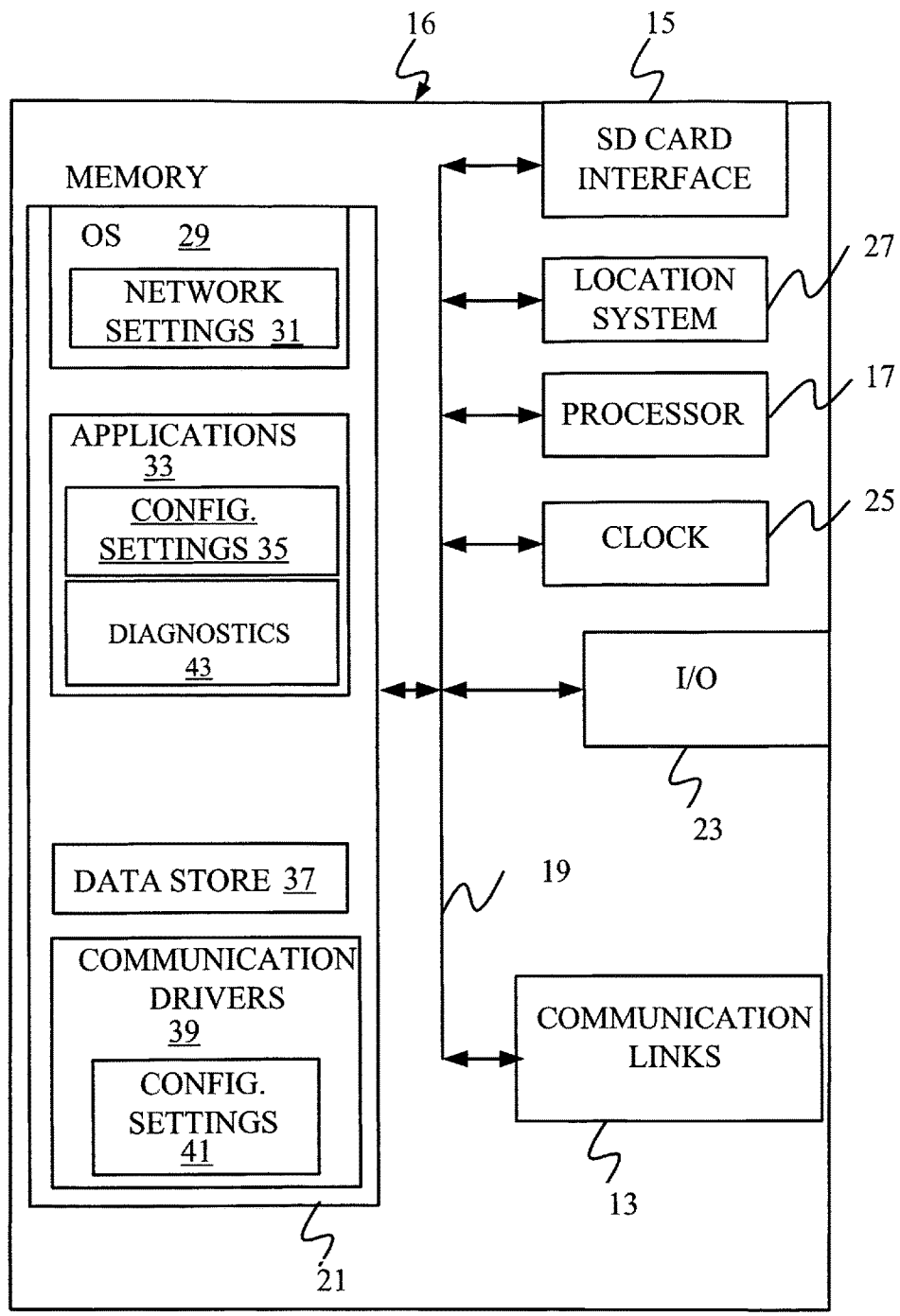
FIG. 10 is a block diagram of a mobile device that can be used to interact with the various computing systems described herein.

FIG. 10 is a simplified block diagram of one illustrative embodiment of a handheld or mobile computing device that can be used as a user's or client's hand held device 16, in which the present system (or parts of it) can be deployed.

FIG. 10 provides a general block diagram of the components of a client device 16 that can run components of system 200 or that interacts with system 200, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25, in one example, comprises a real time clock component that outputs a time and date. It can also provide timing functions for processor 17.

Location system 27, in one example, includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well. Applications 33 can include a computing system diagnostics application 43 that stores, within data store 37, various user functions that may be requested of the computing system 100, 200. The diagnostic application resident on the portable device may cooperate with diagnostic component 114, 214 to receive diagnostic information relative to user requests. Additionally, since the user request is ultimately fulfilled on the user's device, additional diagnostics, such as rendering time on the user device and/or network communication characteristics (such as bandwidth and/or errors) can supplement the actionable diagnostic information provided by diagnostic component 114, 214.

Figure 11:
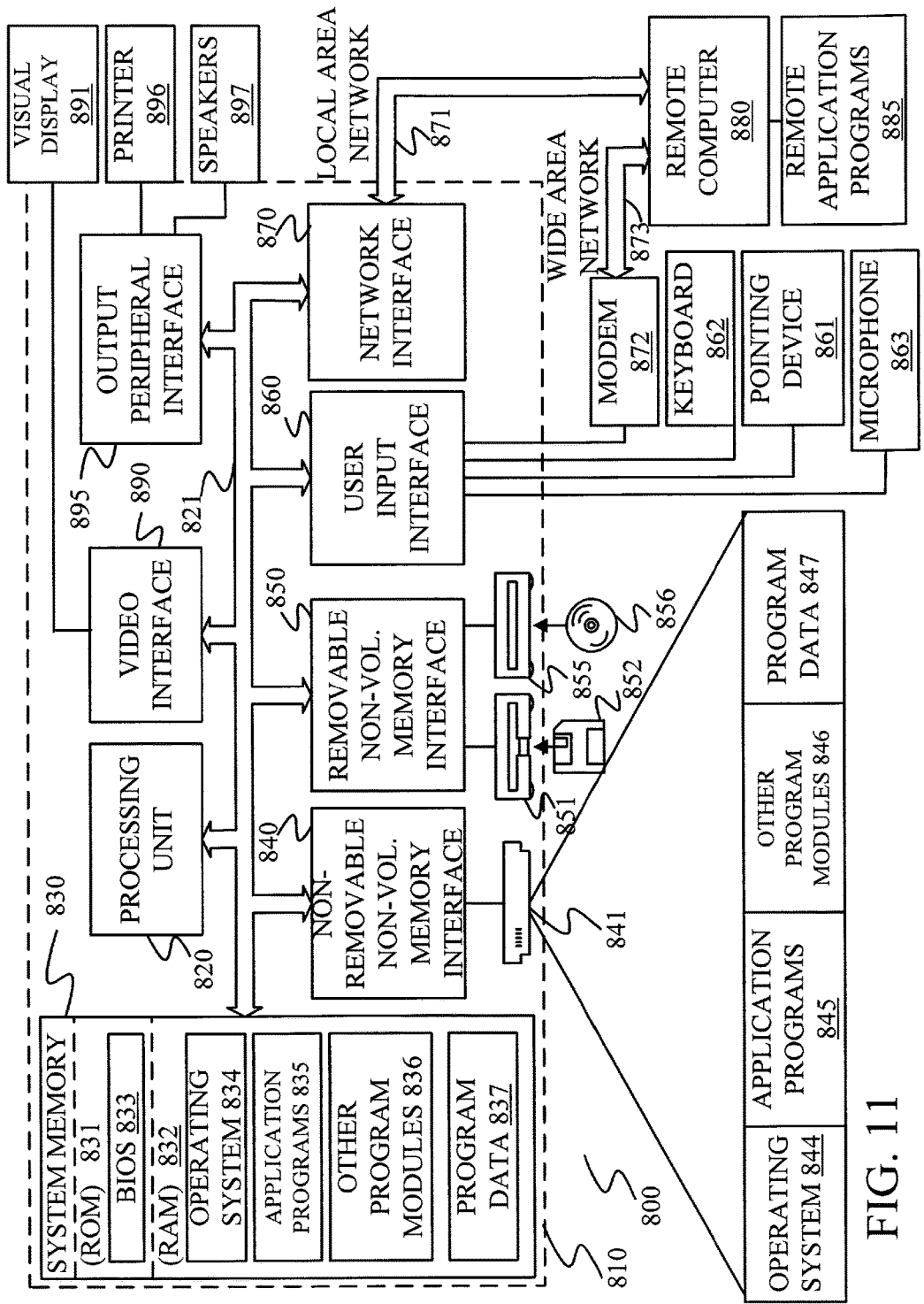
FIG. 11 is a block diagram of one embodiment of a computing environment.

FIG. 11 is one embodiment of a computing environment in which either system 100, 200 or parts of thereof, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 210), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g. ASICs), Program-specific Standard Products (e.g. ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for evaluating the performance of a computer system relative to a user experience, the method comprising:
   identifying a form-load operation that the computer system provides upon user request;
   identifying a plurality of subsystems that are engaged to provide the form-load operation;
   determining physical computing resources that affect each subsystem during subsystem operation;
   performing and timing the form-load operation with the computer system;
   monitoring the physical computing resources that affect each subsystem during the form-load operation; and
   selectively storing an indication of the user request, subsystem execution performance, and physical computing resource parameters based on form-load operation time exceeding a threshold and the physical computing resources operating within defined thresholds during execution of all subsystem operations.

2. The computer implemented method of claim 1, and further comprising providing a ranked indication of form-load performance.

3. The computer implemented method of claim 2, wherein the ranking is based, at least in part, on form-load frequency.

4. The computer-implemented method of claim 2, wherein the ranking is based, at least in part, on form complexity.

5. The computer implemented method of claim 4, wherein form complexity is based, at least in part, on a number of controls present in the form.

6. The computer implemented method of claim 4, wherein form complexity is based, at least in part, on a number of join operations required to open the form.

7. The computer-implemented method of claim 4, wherein form complexity is based, at least in part, on a number of data sources associated with the form.

8. The computer-implemented method of claim 4, wherein the ranking is also based on form-load frequency.

9. A computer system comprising:
   a processor configured to execute instructions to provide a user requested operation;
   a user interface component coupled to the processor, the user interface component being configured to receive a request for the user requested operation and to notify the processor of the request, the user interface component also being configured to provide information to a user in order to complete the request; and
   a diagnostic component coupled to the processor and the user interface component, the diagnostic component being configured to:
      identify reception of the request;
      store a start time relative to the user request;
      identify a plurality of subsystem operations associated with the user requested operation;
      determine physical computing resources required for each subsystem operation;
      measure a time required for each subsystem operation while monitoring the physical resources associated with execution of the subsystem operation;
      determine whether system performance is actionable based on computing total execution time and subsystem operation execution times and physical computing system performance parameters measured during subsystem operation and selectively storing an indication of system performance if the system performance is actionable and the physical computing system performance parameters indicate that the subsystems were not overly burdened during the user requested operation.

10. The computer system of claim 9, wherein the diagnostic component is coupled to a resource that defines at least one user requested operation as having the plurality of subsystem operations and defines physical resource requirements needed for execution of each subsystem operation function.

11. The computer system of claim 10, wherein the resource map defines a threshold relative to each physical computing resource, wherein if the physical computing resource operates beyond the threshold during execution of a subsystem operation, then selectively providing the indication of system performance includes not providing the indication.

12. The computer system of claim 10, wherein the resource map defines a weight assigned to each physical computing resource.

13. The computer system of claim 9, wherein the physical computing resource selected from the group consisting of CPU, cache, system bus, storage, and communication.

14. The computer system of claim 9, and further comprising a form definition component defining a plurality of forms requestable by a user through the user interface component.

15. The computer system of claim 9, wherein the diagnostic component includes an indication of complexity for each user requested operation.

16. The computer system of claim 9, wherein the diagnostic component is configured to provide a ranking of user requested operations.

17. A computer system comprising:
   at least one processor configured to execute instructions to open a form in response to a user request;
   a user interface component coupled to the at least one processor, the user interface component configured to receive a user request to open the form and provide an indication related to the request to the at least one processor, the user interface component also being configured to provide the form to the user in order to complete the request;
   a form definition component defining a plurality of forms requestable by the user through the user interface component; and
   a diagnostic component having a resource that defines a plurality of subsystem operations for opening, each form defined by the business form definition component, wherein each subsystem operation has a plurality of physical computing resource requirements needed for execution of each subsystem operation, and wherein the diagnostic component is configured to measure an amount of time required to open the form requested by the user and defined by the form definition component and selectively store an indication of the user request, subsystem execution performance, and physical computing resource parameters based on physical computing resource information measured during opening of the form.

* * * * *